US 12,270,509 B1

(12) United States Patent
Broussard

(10) Patent No.: US 12,270,509 B1
(45) Date of Patent: Apr. 8, 2025

(54) FUNNEL AND TESTER HOLDER AND DRAIN SYSTEM

(71) Applicant: Larry P. Broussard, Farmville, VA (US)

(72) Inventor: Larry P. Broussard, Farmville, VA (US)

( * ) Notice: Subject to any disclaimer, the term of this patent is extended or adjusted under 35 U.S.C. 154(b) by 0 days.

(21) Appl. No.: 18/534,615

(22) Filed: Dec. 9, 2023

(51) Int. Cl.
*F16N 33/00* (2006.01)
*B67C 9/00* (2006.01)
*B67C 11/00* (2006.01)

(52) U.S. Cl.
CPC ............... *F16N 33/00* (2013.01); *B67C 9/00* (2013.01); *B67C 11/00* (2013.01)

(58) Field of Classification Search
CPC .................................. F16N 33/00; B67C 9/00
USPC ........................ 141/86–88, 106, 364; 248/94
See application file for complete search history.

(56) References Cited

U.S. PATENT DOCUMENTS

| | | | | | |
|---|---|---|---|---|---|
| 2,071,944 | A | * | 2/1937 | Hoffman | A47L 19/04 211/74 |
| 2,575,809 | A | * | 11/1951 | Hankins | F16N 37/00 141/330 |
| 2,781,065 | A | * | 2/1957 | Hofacer | F16N 37/00 211/133.1 |
| 5,168,959 | A | * | 12/1992 | Davis | F16N 31/002 220/345.5 |
| 5,269,354 | A | * | 12/1993 | Koberg | F16N 33/00 141/332 |
| 5,522,437 | A | * | 6/1996 | Blackburn | B09B 3/00 211/74 |
| 5,540,264 | A | * | 7/1996 | Harp | B67D 1/0842 141/366 |
| 5,865,223 | A | * | 2/1999 | Cornford | B65D 90/24 141/86 |
| 11,002,408 | B2 | * | 5/2021 | Plourde | F16N 33/00 |

\* cited by examiner

*Primary Examiner* — Timothy P. Kelly
(74) *Attorney, Agent, or Firm* — Thedford I. Hitaffer; Hitaffer & Hitaffer, PLLC

(57) ABSTRACT

A system for holding funnels and testers comprises a mount for mounting the system to a central location. A collector comprises supports for supporting funnels for drainage therein. The system is also configured for supporting testers for drainage therein. A drape may be provided for protecting the funnels and testers while supported by the system.

21 Claims, 11 Drawing Sheets

FUNNEL AND TESTER HOLDER AND DRAIN SYSTEM

BACKGROUND

The present invention relates to supports for funnels and testers, and more particularly, a system for holding funnels and testers, and for collecting fluids from the same.

Funnels and testers have many applications in many fields of endeavor. For example, in the automotive service industry, funnels are used to add fluids, such as oil, transmission and transaxle fluids and radiator coolant, to automobiles. Testers are used to check fluids. Often funnels and testers are arbitrarily placed and thereafter, may become hard to find. Also, used funnels and testers often carry fluids, and tend to collect dust from the environment, resulting in dirt deposits on the funnels and testers. Fluids and dirt deposits result in contaminated funnels and testers for subsequent use. Moreover, funnels and testers often drain after use when arbitrarily placed on an environmental surface, such as a countertop, the surface of an automobile (i.e., a radiator support bracket or fender), or in an open tool chest. This leaves trace fluids on the environmental surface, which makes for an unclean surface for a service technician. Lastly, different size funnels and testers often have different applications. Randomly placed funnels and testers make the job of a service technician inefficient, resulting in lost profits over time.

What is needed is a support or holder for funnels and testers, which allows for funnels and testers to be stored in a desired location, and which permits funnels and testers to drain into a point of collection, and which may be shielded or protected from dust from the environment.

SUMMARY OF THE INVENTION

The present invention relates to a funnel and tester holder and drain system comprising a collector comprising a body comprising funnel supports. The funnel supports each comprises an opening in the body for receiving at least a portion of a funnel supported by the funnel support for partial passage of the portion of the funnel through the opening in the body. The funnel supports further each comprises a finger supported in relation to the opening for supporting at least a portion of the funnel. The finger is movable to a deflected position away from the body under load from the funnel upon inserting the portion the funnel into the opening to apply pressure to the funnel to hold the funnel in relation to the opening. The collector forms an enclosure for collecting fluids draining from funnels supported by the funnel holder and drain system.

Various advantages of this invention will become apparent to those skilled in the art from the following detailed description of the preferred embodiment, when read in light of the accompanying drawings.

BRIEF DESCRIPTION OF THE DRAWINGS

Various features and attendant advantages of the funnel and tester holder and drain system will become more fully appreciated when considered in view of the accompanying drawings, in which like reference characters designate the same or similar parts and/or features throughout the several views, and wherein.

DETAILED DESCRIPTION OF THE PREFERRED EMBODIMENT

In light of the aforementioned figures, and in accordance with the adopted numbering, one may observe therein an example of a preferred embodiment of the invention, which comprises the parts and elements indicated and described in detail below.

Figure 1:
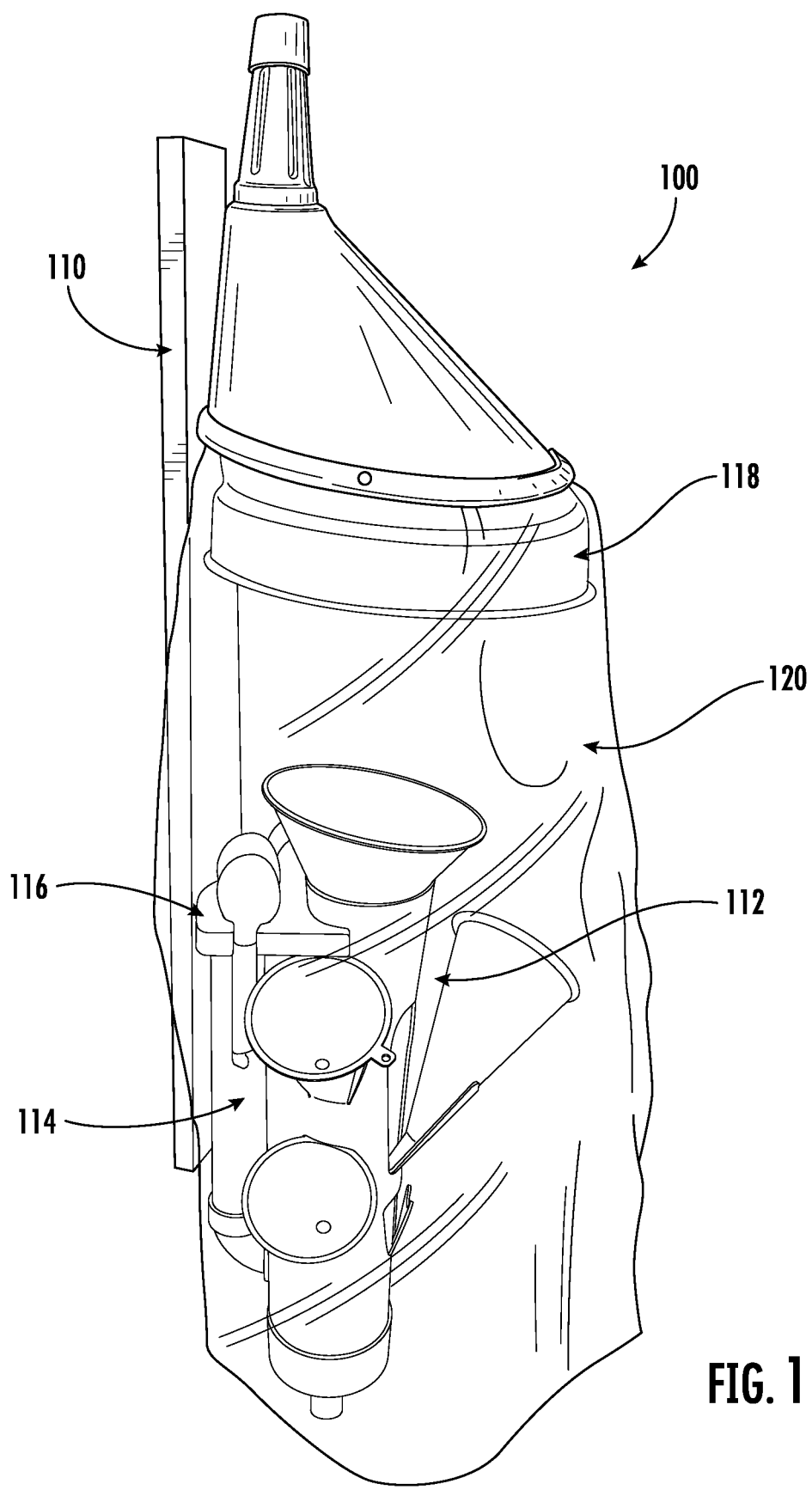
FIG. 1 is an environmental front perspective view of an exemplary funnel and tester holder and drain system.
Figure 15:
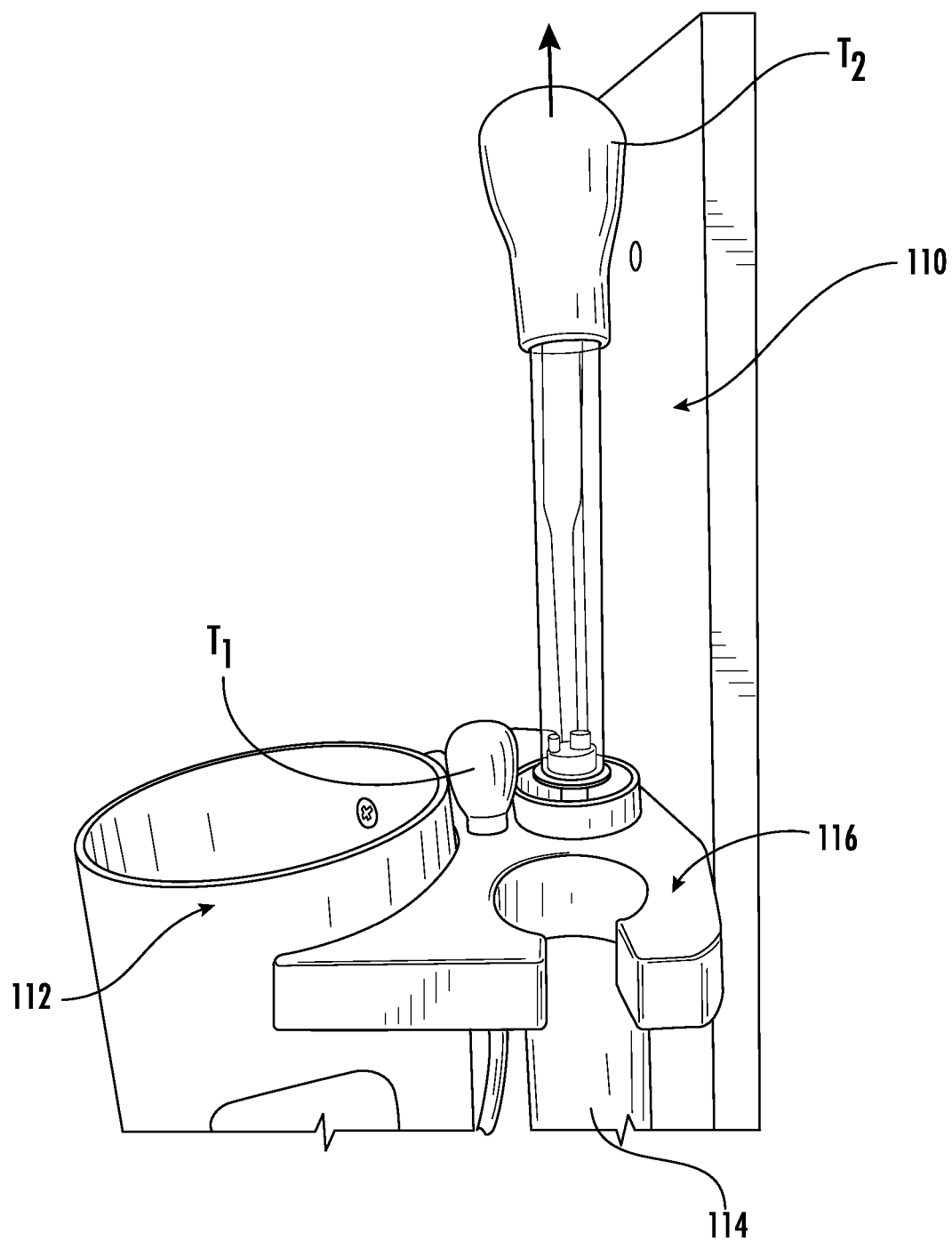
FIG. 15 is an enlarged side view of a portion of the funnel and tester holder and drain system supporting an exemplary tester.
Figure 16:
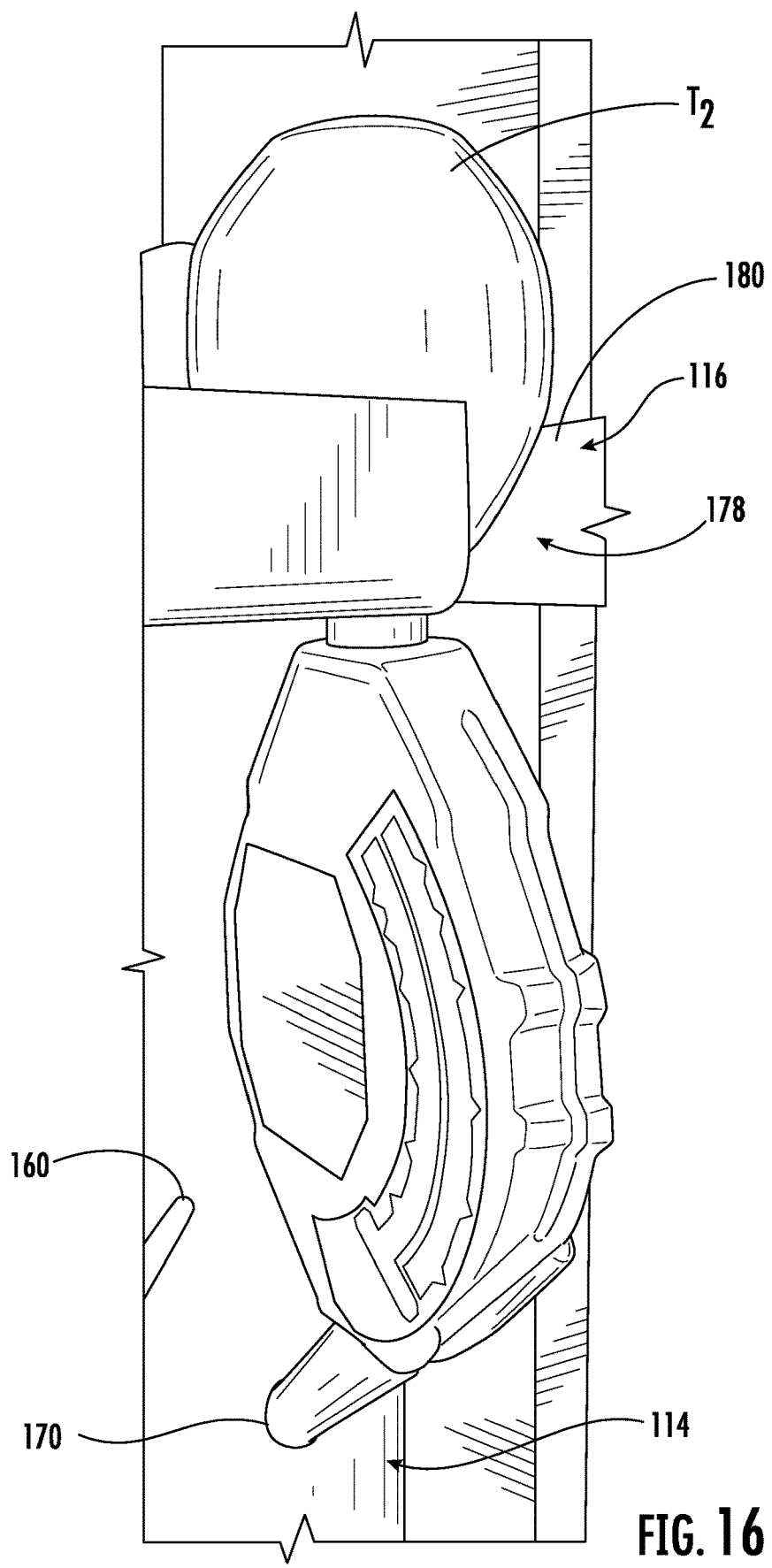
FIG. 16 is an enlarged side view of a portion of the funnel and tester holder and drain system supporting an exemplary tester.

With reference to FIG. 1, there is illustrated a funnel and tester holder and drain system 100 for supporting funnels and which may support testers used by service technicians, including but not limited to automobile service technicians. A base, plate, plaque or other suitable mount (hereinafter mount 110) may be provided for mounting the funnel and tester holder and drain system 100 in relation to a supporting surface, such as a wall, the side of a tool chest, or the like. A first or principal body or member may be in the form of or function as a reservoir, container or collector (hereinafter first collector 112). The first collector 112 is configured for receiving funnels F1-F8 (shown more clearly in FIG. 2) of various sizes and shapes, for collecting fluids from the funnels F1-F8, as will become apparent in the description that follows. A second or secondary body or member, which may be in the form of or function as a tube, catch, drain for collecting (hereinafter second collector 114), may be provided for collecting fluids from testers T1-T4 (shown in FIGS. 14-16) and the like, as will become apparent in the description that follows. A brace, bracket, or other suitable support (hereinafter brace 116) may support the second collector 114 in relation to the mount 110 and be configured to support the testers. A canopy 118 may be provided atop the funnel and tester holder and drain system 100 and a drape 120 may be supported in relation to the canopy 118 about the funnel and tester holder and drain system 100 for shielding or protecting funnels supported by the funnel and tester holder and drain system 100 from dust from the environment.

Figure 2:
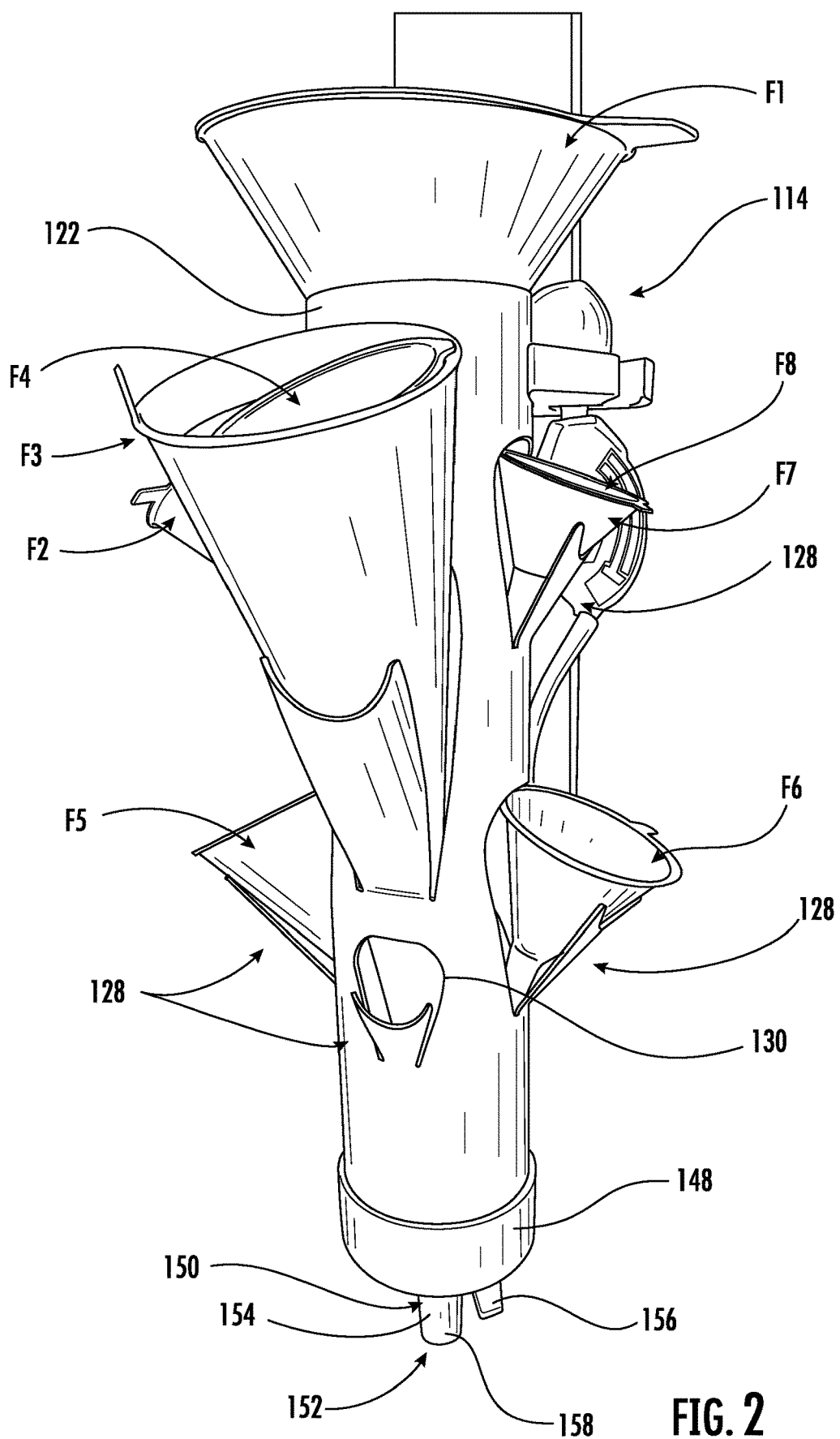
FIG. 2 is an environmental front perspective view of the exemplary funnel and tester holder and drain system, in relevant part, with a drape removed.
Figure 3:
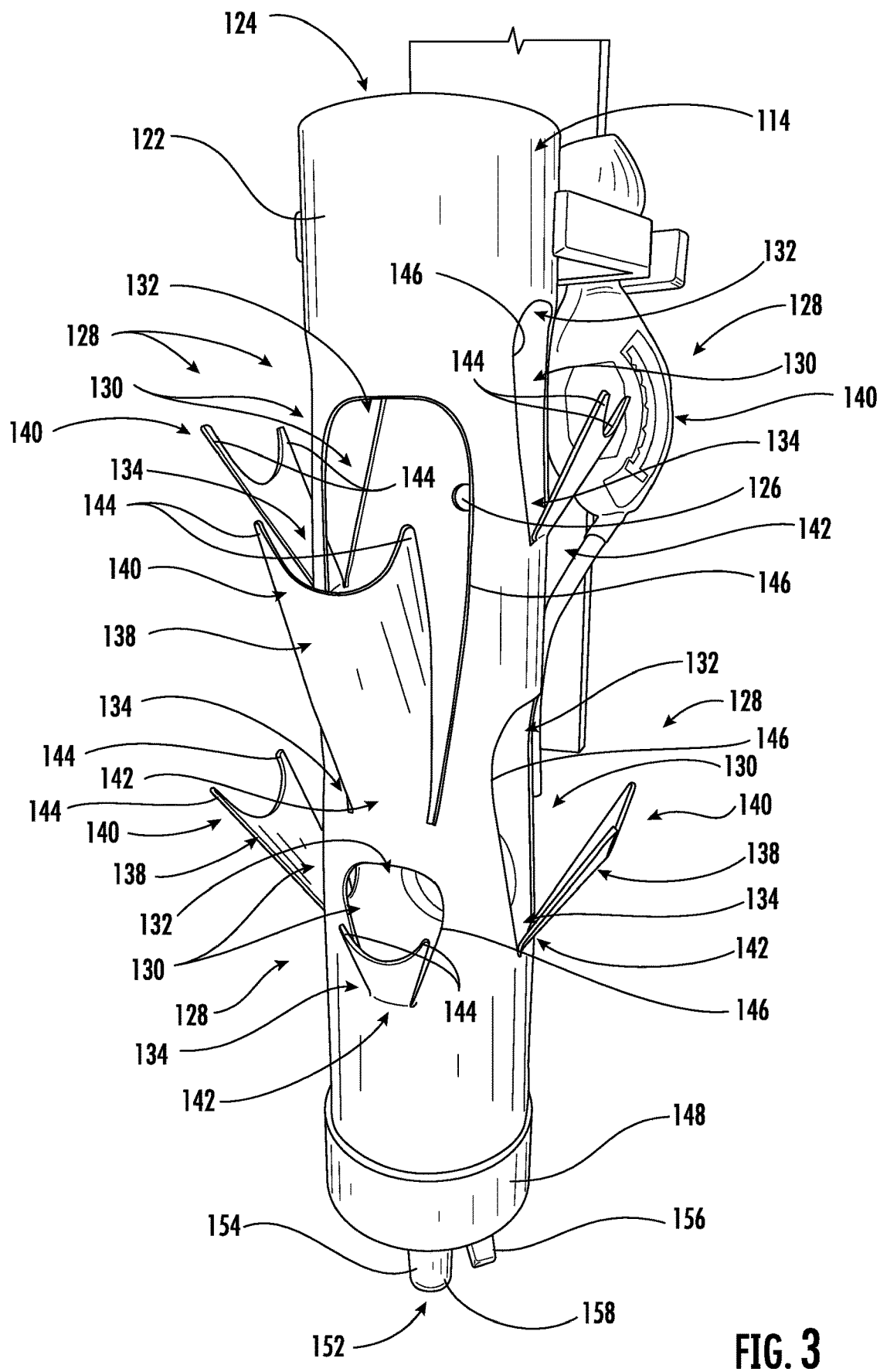
FIG. 3 is an environmental front perspective view of the exemplary funnel and tester holder and drain system, in relevant part, with the drape and funnels removed.

As shown in FIGS. 2-3, the first collector 112 may be comprised of a body 122, which in the illustrated embodiment may be a cylindrical body. The body 122 may be comprised of an upper open end 124 for receiving a large funnel F1 for holding the funnel F1. Various reliefs, openings or holes 126 may pass through the body 122 in an upper or medial portion or region of the body 122. In the illustrated embodiment, a single hole 126 is provided in the back, rear or blind side of the body 122 (as viewed from the inside of the body 122 when viewing FIG. 3) (also shown in FIG. 4). This hole 126 may be configured to receive a siphon or discharge tube of a small tube tester T1 (shown in FIG. 4), such as a small hydrometer for testing the electrolytes in battery fluids to determine the health of a battery, as will become apparent in the description that follows.

Funnel supports 128 are provided at various locations in relation to the body 122. The funnel supports 128 are configured for supporting various size funnels/funnel ends F2-F8. The funnel supports 128 may be comprised of reliefs, holes or openings 130 provided in the body 122. The openings 130 may be various size openings for receiving various size funnels/funnel ends F2-F8. The openings 130 may have an arcuate upper portion 132 and a narrowing at a lower portion 134 so as to have a shape akin to an inverted teardrop. It should be noted that larger openings 130 may be provided in some areas (e.g., an upper forward portion and lower side portions) and smaller openings 130 may be provided in other areas (e.g., a lower front portion and upper side portions), such as in a staggered arrangement, so the various size funnels/funnel ends F2-F8 may be supported by the funnel and tester holder and drain system 100 without interfering with other funnels/funnel ends F2-F8.

The funnel supports 128 may further comprise supports, extensions, leafs or fingers 138, which may be sized and shaped to comport or compliment the openings 130. The fingers 138 may be flexible and cantilevered in relation to the body 122 at a lower end or portion of the opening 130. An upper end or portion of the fingers 138 may be U-shaped or arcuate in shape or otherwise shaped to receive an outer surface of an upper portion of the funnels/funnel ends F2-F8. In the illustrated embodiment, the fingers 138 comprise a forked upper end 140 and a narrowing or tapered lower end 142, which terminates at or originates from the periphery of the body 122. The forked upper end 140 may comprise opposingly disposed lateral extensions, points or tines 144 that extend upward to provide lateral barriers or supports or guides for guiding and/or receiving a portion of the funnels/funnel ends F2-F8 therebetween and providing lateral support of the funnels/funnel ends F2-F8 therebetween.

Figure 5:
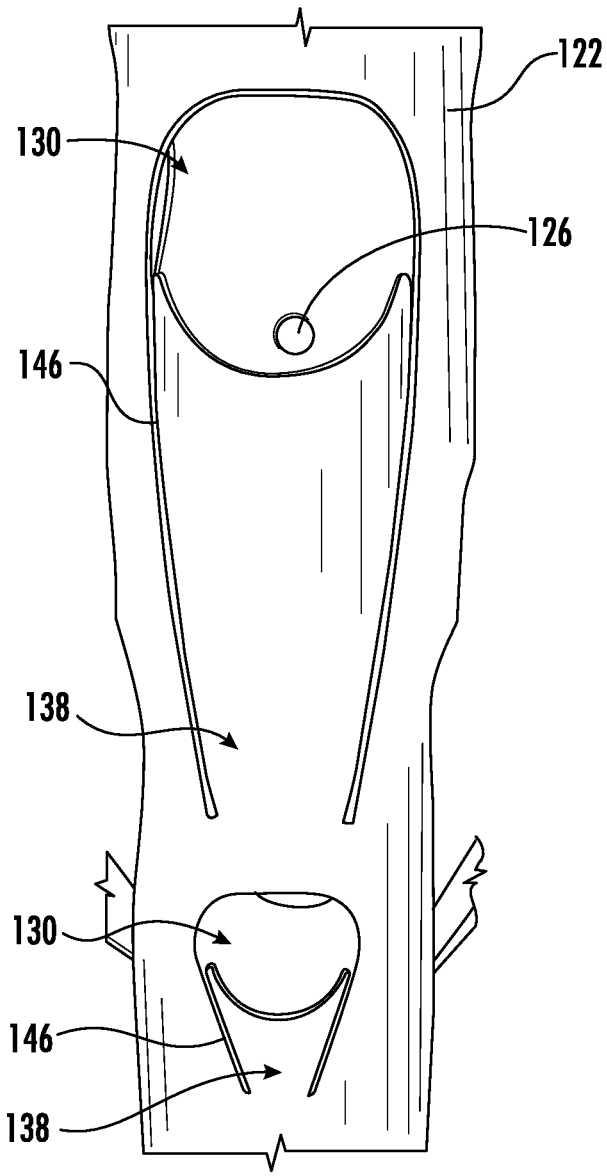
FIG. 5 is an enlarged front view of a portion of the funnel and tester holder and drain system showing exemplary funnels supports.

The body 122 may in the form of a cylindrical body formed of plastic, such as a four-inch polyvinyl chloride (PVC) pipe or insulation jacket (e.g., a thin wall PVC pipe (e.g., 3/32-inch thick)). The openings 130 may be formed in the wall of the cylindrical body by cutting through the cylindrical body (e.g., by making an inverted U-shaped cut 146 through the wall of the cylindrical body (shown in FIG. 5)), wherein the area within the cut 146 defines the opening 130. The lower ends of legs of the inverted U-shaped cut 146 are spaced apart with lower ends of the fingers 138 therebetween. The fingers 138 may be an integral part of the cylindrical body. For example, in addition to forming the openings 130, the cuts 146 in wall of the cylindrical body may at the same time form the fingers 138. The lower end of the fingers 138 remains integral or a part of the wall of the cylindrical body. The fingers 138 may be bent away from the cylindrical body, with a fold line extending between the lower ends of legs of the inverted U-shaped cut 146. In this way, the fingers 138 may be cantilevered. The cut 146 may be narrow at the bottom so that the fingers 138 may readily move, flex or deflect when integral with the cylindrical body. The fingers 138 may also have a memory component or characteristic that permits the fingers 138 to return to an original position from the move, flexed or deflected condition.

Figure 6:
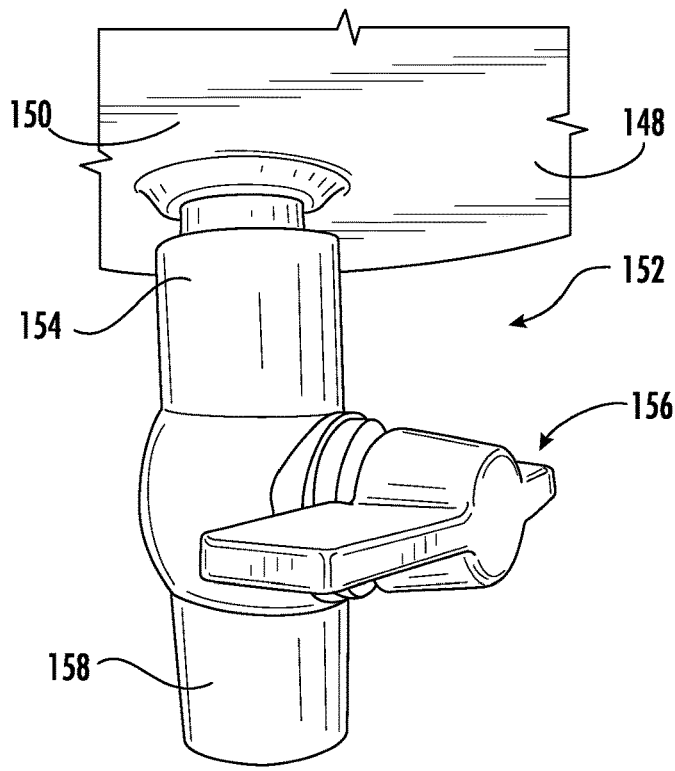
FIG. 6 is an enlarged view of a bottom portion of the funnel and tester holder and drain system showing a drain for draining fluids collected by the funnel and tester holder and drain system.

The lower end of the first collector 112 may be provided with a cap, closure, or closed end 148 to trap fluids in the collector 112. In other words, fluids dripping or discharging from the funnels/funnel ends F1-F8, after using the funnels F1-F8, when the funnels F1-F8 are supported by the funnel and tester holder and drain system 100, are captured or trapped in the collector 112. A passage 150 (shown more clearly in FIG. 6) may be provided for discharging/releasing fluids from the collector 112. Fluid flow through the passage 150 may be controlled by a drain valve 152, such as a ¼-turn valve, which may include an enclosure or body 154 housing or containing a seat, O-ring, stem and ball (not shown but conventional in the art), controlled by a handle 156 for releasing fluid through a nozzle 158 (shown in FIG. 6).

Figure 7:
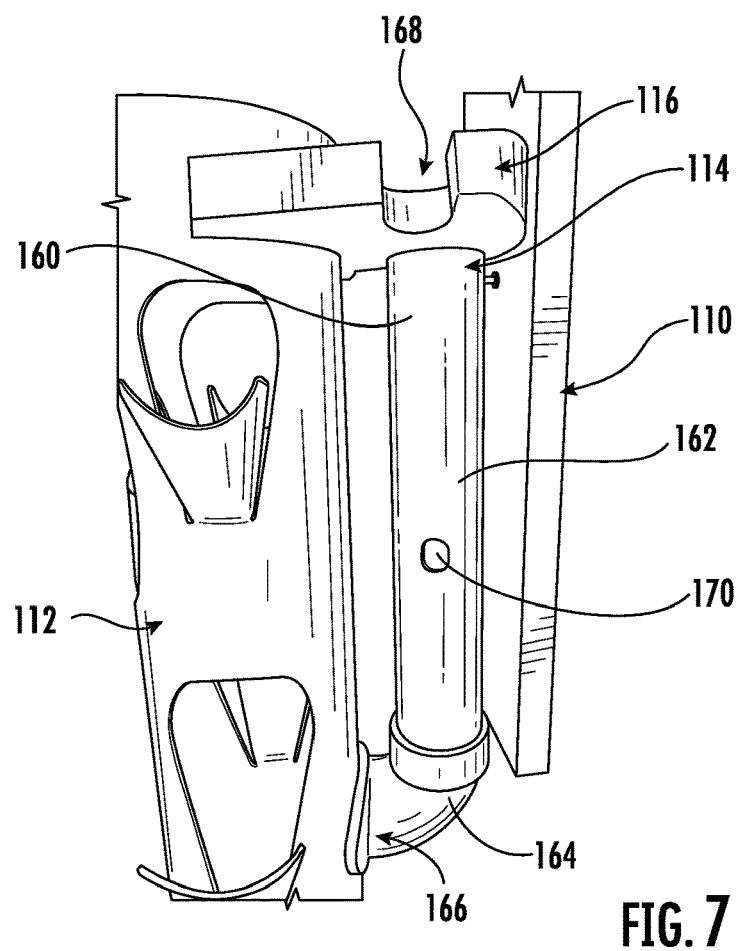
FIG. 7 is an enlarged side view of the funnel and tester holder and drain system, in relevant part, showing a second collector.

The second collector 114 may be supported in relation to the first collector 112, as illustrated in FIG. 7. In the illustrated embodiment, the second collector 114 extends, runs or is otherwise located or supported parallel or substantially parallel in relation to the first collector 112, behind the first collector 112 in the illustrated embodiment. An exemplary embodiment of the second collector 114 may be comprised of a body 160. The body 160 may be comprised of a first or vertical, longer leg (hereinafter longer leg 162) and a second or horizontal, shorter leg (hereinafter shorter leg 164) so as to form a L-shaped configuration. The body 160 may be in the form of a cylindrical body formed of plastic, such as 1½-inch polyvinyl chloride (PVC) pipe (e.g., ⅛ inch wall thickness), which may be comprised of a section of straight pipe forming the longer leg 162 and a 90° street elbow coupling forming the shorter leg 164. An upper end of the second leg 164 may be provided with a belled end (e.g., made to flare out, which allows the lower end of the longer leg 162 to slide into the shorter leg 164 without the aid of a coupling) and a lower end of the shorter leg 164 may be provided with a plain end (e.g., a type of pipe end that has the same diameter as the rest of the length of pipe) for insertion into an opening 166 in a lower to medial region of a rear wall of the first collector 112. Of course, the lower end of the second leg 164 is preferably sealed in relation to the opening 166 in the first collector 112 so as to prevent fluid from flowing between the shorter leg 164 and the opening 166 in the first collector 112. The body 160 may be comprised of an opening or open upper end 168 for receiving large tube tester T2 (shown in FIGS. 14-15), such as a large hydrometer, which may be for use in testing electrolytes in battery fluids. Opposingly disposed lateral openings, reliefs or holes (hereinafter holes 170) (only one side shown) may be provided in lateral sides of the body 160. These holes 170 may be shaped or configured to receive siphon or discharge tubes of laterally supported tube testers T3, T4 (shown in FIGS. 14 and 16). Such testers T3, T4 may include, for example, various types of antifreeze/coolant testers and hydrometers/battery fluid testers.

The upper end of the second collector 114 may be supported in relation to the upper end of the first collector 112 by the brace 116 and a rear wall of the second collector 114 may be supported by the mount 110. The brace 116 may be comprised of a forward central cutout or relief 173 shaped for mating with or conforming to or receiving the surface or outer wall of an upper portion of the first collector 112. A medial central opening, relief or passage 174 may be sized and shaped or otherwise configured to receive and support the small tube tester T1 in close proximity to the hole 126 provided in the back, rear or blind side of the body 122 that is configured to receive the siphon or discharge tube of the small tube tester T1. Opposingly disposed, laterally spaced, lateral slotted openings, reliefs or passages 176 may be provided and shaped and dimensioned or otherwise configured for receiving and supporting tester bodies. These passages 176 may be provided with a slot 178 for passage of a tester or a portion thereof and a larger opening 180 shaped and dimensioned or otherwise configured for receiving and supporting a ball portion of the laterally supported tube testers T3, T4 (shown in FIGS. 14 and 16). The laterally supported tube testers T3, T4 may be supported in close proximity to the holes 170 in the lateral sides of the body 160 for receiving the siphon or discharge tubes of the laterally supported tube testers T3, T4. The opening 180 may be conical or partially spherical for supporting the bulb portion in a seated condition. The testers T3, T4 may be of the type a hydrometer battery fluid tester and an antifreeze/coolant tester, which each may comprise the bulb, a container or chamber, and siphon or discharge tube or nozzle. The rear central hole, opening or passage 182 may be shaped and dimensioned or otherwise configured for the passage of the upper end of the second collector 114 in a manner that would render the opening or open upper end of the second collector 114 exposed for receiving the large tube tester T2 for supporting the large tube tester T2.

Figure 9:
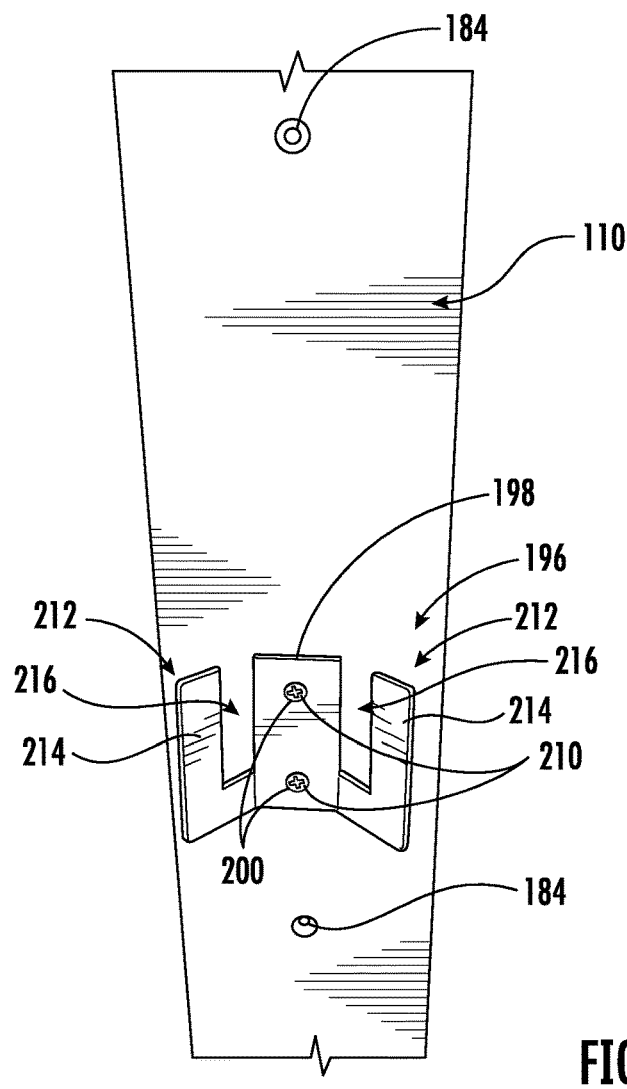
FIG. 9 is an enlarged front view of a portion of a mount of the funnel and tester holder and drain system and showing exemplary fastening means for fastening a canopy to the mount.
Figure 10:
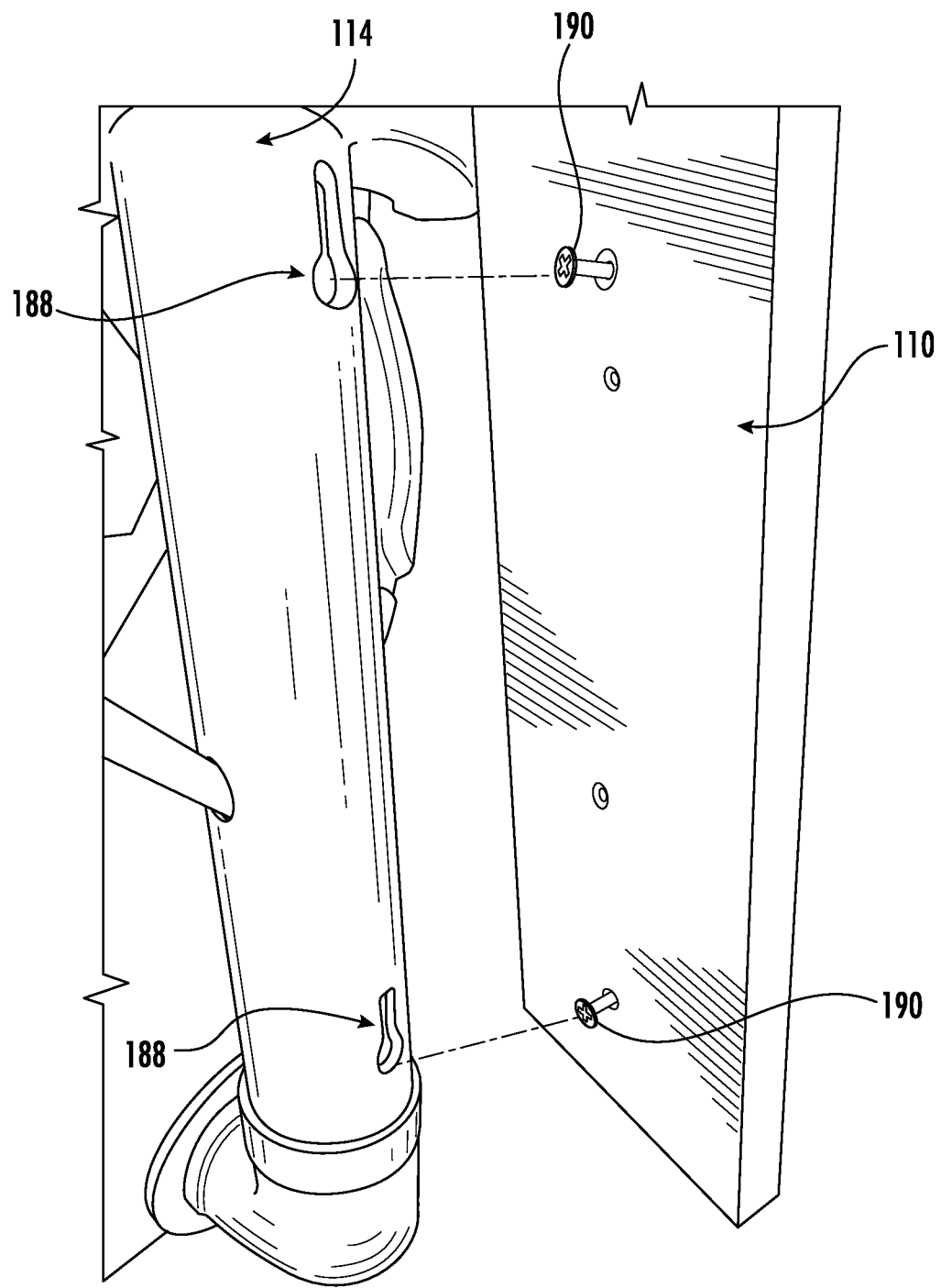
FIG. 10 is an enlarged exploded side view of exemplary fastening means for fastening the second collector to the brace.
Figure 11:
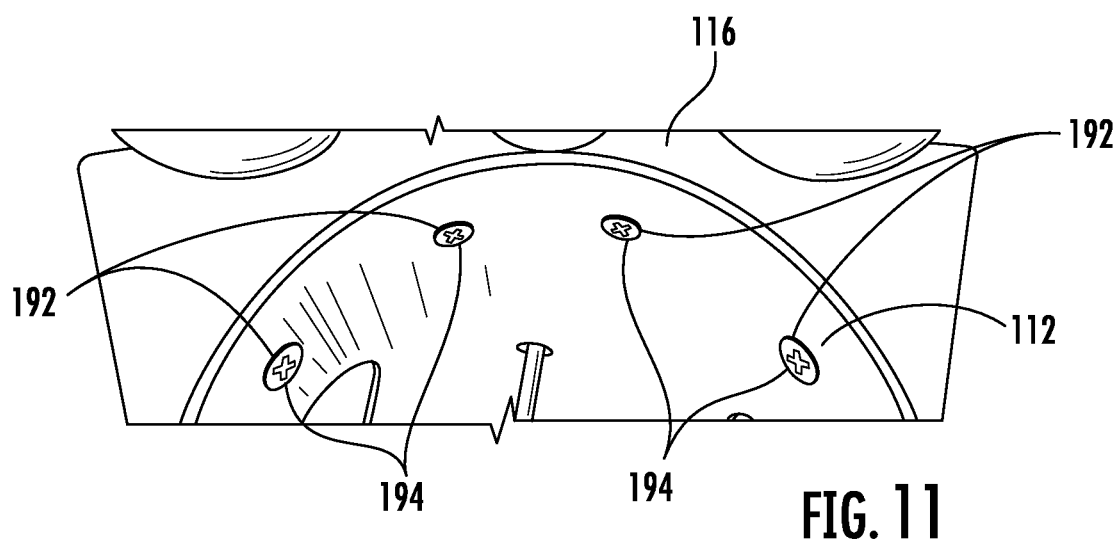
FIG. 11 is an enlarged top view of exemplary means for fastening a first collector to a brace.

It should be appreciated that the funnel and tester holder and drain system 100 may be formed or configured and/or assembled in any suitable manner. For example, fastening means may be provided for fastening the mount 110 to a supporting surface. In the illustrated embodiment, the mount 110 may be provided with countersunk through holes 184 (shown in FIG. 9) through which fasteners, such as flat head, wood, metal or masonry screws, including self-tapping screws (not shown but conventional in the art), may pass and be threaded into a supporting surface (e.g., wall, bench, counter or the like). Additionally, fastening means may be provided for fastening the second collector 114 to the mount 110. For example, as shown in FIG. 10, the second collector 114, or a rear portion thereof, may be provided with key holes 188, comprising an opening and adjoining slot, for receiving fasteners 190, such as pan head screws, threaded into or otherwise supported in fixed relation to the mount 110 for supporting the second collector 114 in relation to the mount 110. Further, fastening means may be provided for fastening the first collector 112 in relation to the brace 116, which is supported in relation to the second collector 114. For example, as shown in FIG. 11, the first collector 112 may be provided with countersunk through holes 192 configured to permit passage of fasteners 194, such as flat head, wood, metal or masonry screws, including self-tapping screws, which may be threaded into the brace 116, which may be pre-drilled, to secure the first collector 112 in fixed relation to the brace 116. In this way, the first collector 112 is supported in relation to the second collector 114 by the brace 116, and the second collector 114 is supported in relation to the mount 110, which may be mounted in relation to the supporting surface (e.g., wall, bench, counter or the like).

Figure 12:
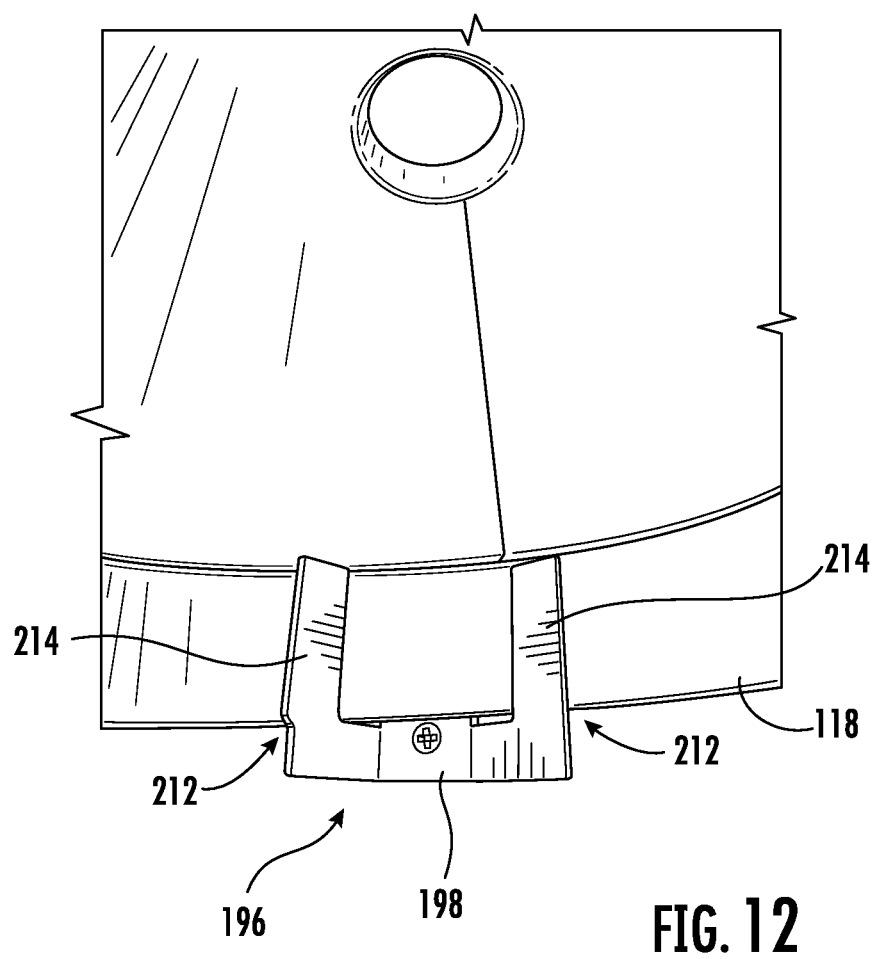
FIG. 12 is an enlarged front view of the canopy fastened to the mount.

The canopy 118 provided atop the funnel and tester holder and drain system 100 may be in any suitable form. In the illustrated embodiment, the canopy 118 is in the form of a wide mouth funnel, which is inverted and supported in relation to the mount 110 above the first and second collectors 112, 114. The canopy 118 may be supported in relation to the mount 110 in any suitable manner. For example, as shown in FIG. 9, a forked bracket or other suitable mounting arrangement (hereinafter bracket 196) may be supported in relation to the mount 110. The bracket 196 may comprise a generally flat central plate 198 with countersunk through holes 200 passing therethrough for receiving fasteners 210, such as flat head, wood screws, which may be threaded into the mount 110 for securing the bracket 196 in fixed relation to the mount 110. The bracket 196 may have angularly disposed portions 212, which extend forward and away from the mount 110, and at an angle in relation to the central plate 198, to provide a space between the angularly disposed portions 212 and the mount 110 for receiving a brim or other suitable structure (hereinafter brim) of the canopy 118, as shown in FIG. 12. The angularly disposed portions 212 may be comprised of tines or upwardly projecting members (hereinafter tines 214) with opposingly disposed, laterally spaced slots 216 for receiving the brim of the canopy 118 for releasably supporting the canopy 118 in relation to the mount 110.

Figure 13:
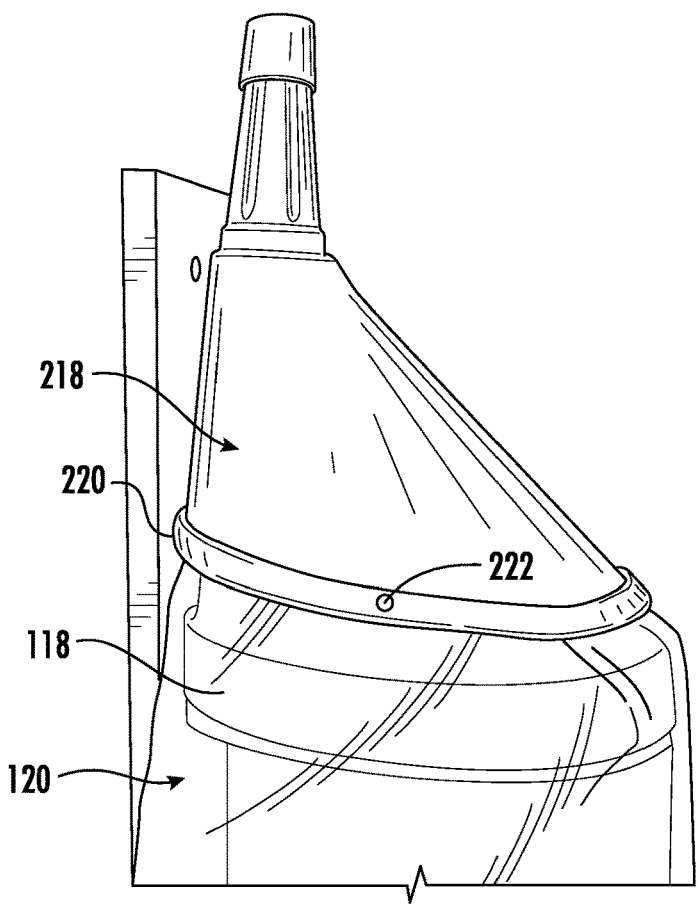
FIG. 13 is an enlarged side view of an exemplary support for the drape.

The drape 120 may be supported in relation to the canopy 118. This may be done in any suitable manner. For example, as shown in FIG. 13, a secondary canopy 218 may be supported in relation to the canopy 118. The secondary canopy 218 may fit over or nest with the canopy 118. In the illustrated embodiment, the secondary canopy 218 may be in the form of a large offset funnel that fits over or nests with the wide mouth funnel forming the canopy 118. The drape 120 may be supported in relation to a lower peripheral edge of the canopy 218. In the illustrated embodiment, the drape 120 is supported in relation to the peripheral edge of the canopy 218 by edge trim 220. Such trim may be in the form of a rubber edging configured to be pushed in place over the peripheral edge of the canopy 218. The trim may be reinforced with a wire core or segmented wire core. The trim may be a U-shaped configuration with a tight groove between folded portions or legs of the U-shaped configuration with integral tongues for added grip and metal-reinforced for impact resistance. An example of such trim is Edge Trim ES28-140-P60 by Elasto Proxy. The drape 120 may be trapped in the edge trim when pushed in place over the peripheral edge of the canopy 218. The edge trim may be mechanically fastened to the peripheral edge of the canopy 218 by supplemental fasteners, such as rivets 222. The drape 120 may be in the form of one or more sheets of impervious material, such as a clear plastic sheets, the top of which may be supported in relation to the peripheral edge of the canopy 218, and the bottom of which may hang to a lower portion of the first collector 112 to cover the funnels F1-F8 supported by the funnel and tester holder and drain system 100 to shield or protect the funnels F1-F8 from dust, dirt and other environmental particles and/or contaminants. As shown in FIG. 1, the drape 120 may be comprised of two sheets (e.g., left and right sheets), rear side edges of which may be attached to opposing lateral edges of the mount 110, along the lengthwise or elongated side edges of the mount 110 (e.g., in a vertical direction when viewing FIG. 1). The sheets comprise front edges that may overlap or be configured to be pulled or otherwise positioned in close proximity to one another in front of the first collector 112 (as shown in FIG. 1) to form an enclosure about the first collector 112 to cover the funnels F1-F8.

In use, funnels may be inserted into desired openings 130, as shown in FIG. 2, for example, with longer funnels F3-F4 (e.g., long neck funnels) in openings 130 in an upper portion of the funnel and tester holder and drain system 100 so as to have room for the funnels to extend downward into the first collector 112, and shorter funnels F5-F6 in openings 130 in a lower portion of the funnel and tester holder and drain system 100, and smaller funnels F2 and F5-F8 (e.g., smaller diameter funnels) in smaller openings 130 and larger funnels F3-F4 (e.g., large diameter funnels) in larger openings 130. Some funnels F3-F4 may extend out and away from the opening 130, with the fingers 138 pressing inward against the funnels F3-F4 by virtue that the funnels F3-F4 are forced or pressed into the opening 130, causing the fingers 138 to deflect away from the opening 130 under load. Other funnels F2 and F5-F8 may be pressed downward into openings 130 by a user until an upper rim of the funnels F2 and F5-F8 are positioned below the arcuate upper portion of the opening 132 and enters into the opening 130 and is forced into the opening 130 by a corresponding finger 138 under load, forming a snap fit configuration. It should be understood that the fingers 138 are subject to a load by pushing the funnels into the openings 130 causing the fingers 138 to be deflected outward. It should be appreciated that a greater number of funnels may be supported by the funnel and tester holder and drain system 100 than funnel supports 128 provided by nesting smaller funnels F4 into larger funnels F3. A larger funnel F7 (e.g., larger diameter funnel) may be inserted into the upper open end 124 of the first collector 112 and be supported in the upper open end 124 by gravity. The canopy 118 may be in the form of a wide mouth funnel, which may be used by the user and then replaced to form the canopy 118.

Figure 4:
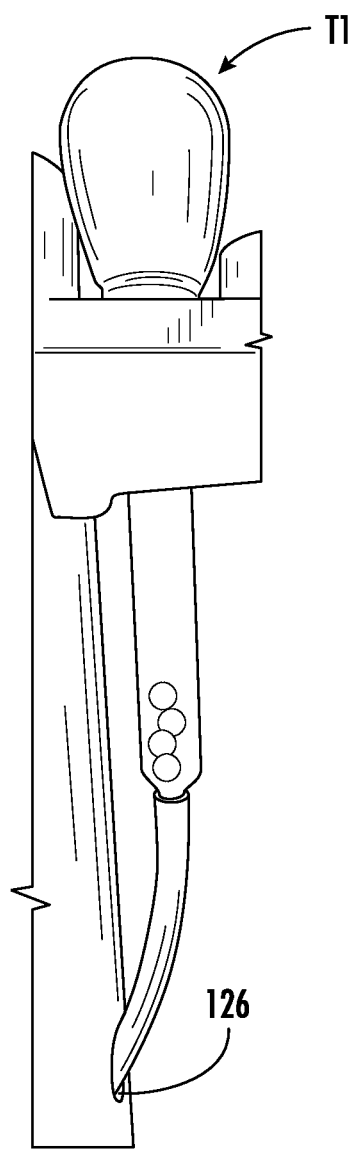
FIG. 4 is an enlarged side view of a portion of the funnel and tester holder and drain system supporting an exemplary tester.
Figure 8:
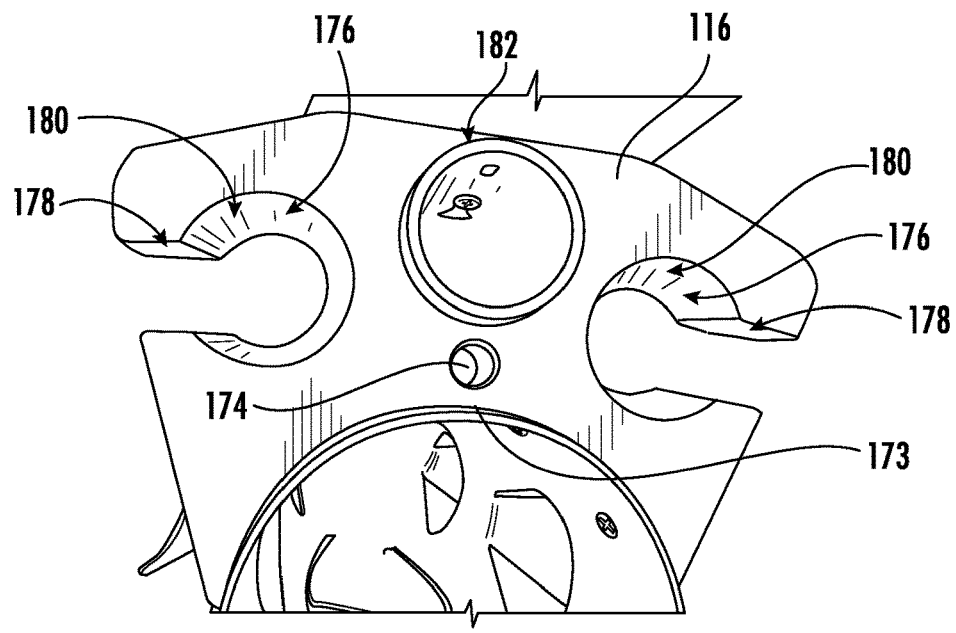
FIG. 8 is an enlarged top view of a portion of a brace of the funnel and tester holder and drain system.
Figure 14:
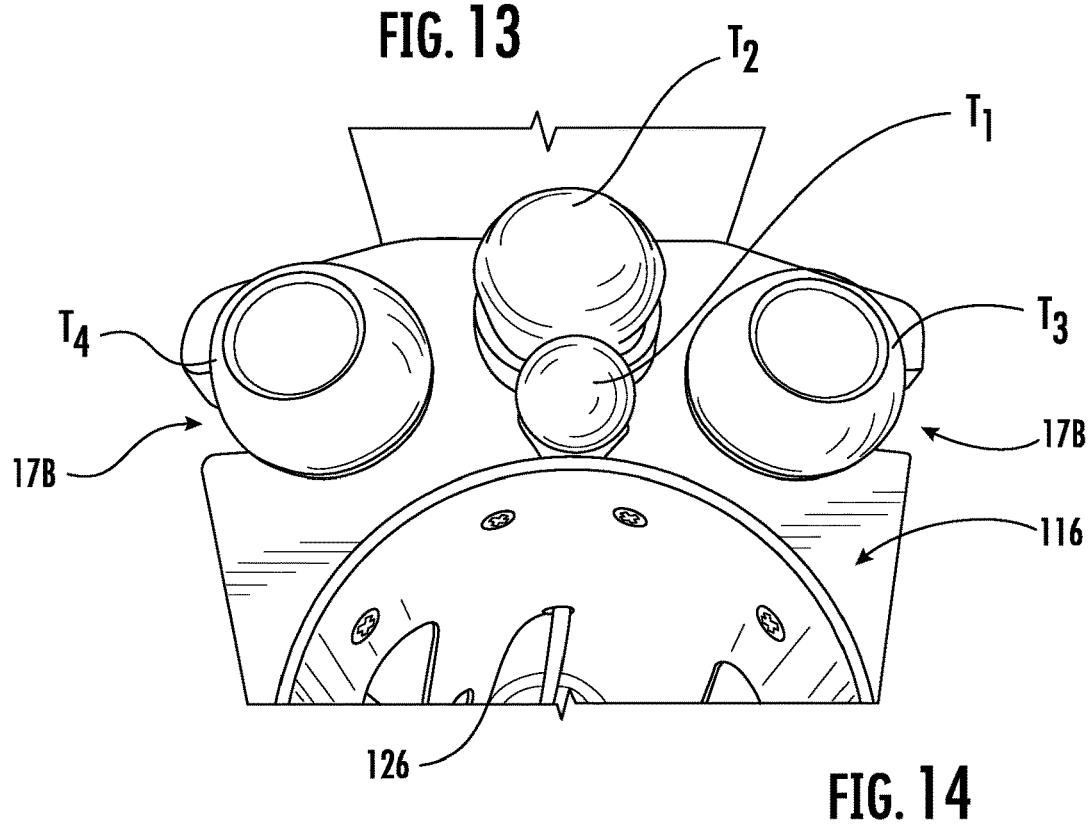
FIG. 14 is an enlarged top view of a portion of the brace supporting testers.

As shown in FIG. 14, testers T1-T4 may be supported by the brace 116. For example, as shown in FIG. 4, a small tube tester T1, such as a small hydrometer, which may be for use in testing electrolytes in battery fluids, may be received and supported by the medial central opening, relief or passage 174 (shown in FIG. 8) in the brace 116 with the siphon or discharge tube inserted in the hole 126 in the back, rear or blind side of the body 122 so that fluids draining therefrom may drain into the first collector 112. Another tester T2 (shown in FIG. 15), such as a large hydrometer, which may be for use in testing electrolytes in battery fluids, may be supported in the open upper end 168 of the body 160 forming the second collector 114, which may drain into the first collector 112. The opposingly disposed passages 176 (shown in FIG. 8) support testers T3, T4. The slots 178 provide passage of the testers T3, T4 portion thereof and the larger opening 180 supports a ball portion of the testers T3, T4 (shown in FIGS. 14 and 16). The laterally supported tube testers T3, T4 may be supported in close proximity to the holes 170 in the lateral sides of the body 160 for receiving the siphon or discharge tubes of the laterally supported tube testers T3, T4 (see tester T3 in FIG. 16). The opening 180 may be conical or partially spherical for supporting the bulb portion in a seated condition or position. The testers T3, T4 may be of the type of a hydrometer battery fluid tester and an antifreeze/coolant tester, which each may comprise the bulb, a container or chamber, and siphon or discharge tube or nozzle. The funnel and tester holder and drain system 100 permits fluids to drain from the funnels F1-F8 and testers T1-T4 into the collector 112 and may be appropriately disposed by draining the collector 112, thus protecting the environment.

With the funnels F1-F8 and testers T1-T4 supported by the funnel and tester holder and drain system 100, the drape 120 may drape about the first collector 112 and the funnels supported by the first collector 112. The funnels F1-F8 and testers T1-T4 may be accessible simply by opening the drape 120. The funnel and tester holder and drain system 100 may store or hold the funnels F1-F8 and testers T1-T4 in a central location and may provide an arrangement that provides easy access to the same for use by a user. In this way, the user is permitted to easily locate a funnel F1-F8 or tester T1-T4, ready to use, when needed. Of course, it should be appreciated that the funnel and tester holder and drain system 100 may be configured to support a plethora of funnels, of various sizes, including long neck funnels and long stem funnels.

It should be noted that orientational terms used throughout this description are with reference to the orientation of the invention and component parts thereof as presented in the accompanying drawings, which is subject to change. Therefore, orientational terms are used for semantic purposes, and do not limit the invention or its component parts in any particular way.

While the invention and components parts thereof may have been described herein in terms of certain components being referred to in either the singular or the plural, other arrangements are possible. For example, it is to be understood that due to the conceptual description presented herein, components presented in the singular may be provided in the plural, and vice versa.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

PARTS LIST

100 Funnel and Tester Holder and Drain System
110 Mount
112 First Collector
114 Second Collector
116 Brace
118 Canopy
120 Drape
122 Body
124 Upper Open End
126 Hole
128 Funnel Support
130 Openings
132 Upper Portion of Openings
134 Lower Portion of Openings
136 Arcuate Shaped Upper End
138 Fingers
140 Forked Upper End
142 Narrowing Lower End
144 Opposingly Disposed Lateral Tines
146 inverted U-Shaped Cut
148 Cap, Closure, Closed End
150 Passage
152 Drain Valve 154 Body
156 Handle
158 Nozzle
160 Body
162 First Leg
164 Second Leg
166 Opening
168 Open Upper End
170 Opposingly Disposed Lateral Holes
173 Relief
174 Passage
176 Passage
178 Slot
180 Larger Opening
182 Rear Central Passage
184 Fastening Means/Holes
188 Fastening Means/Key Holes
190 Fasteners
192 Fastening Means/Holes
194 Fasteners
196 Bracket
198 Central Plate
200 Through Holes
210 Fasteners
212 Angularly Disposed Portions
214 Tines
216 Slots
218 Secondary Canopy
220 Edge Trim
222 Rivets
F Funnel
T Tester

What is claimed is:

1. A funnel holder and drain system for supporting funnels, the system comprising:
a collector comprising a body comprising funnel supports, the funnel supports each comprising an opening in the body for receiving at least a portion of a funnel supported thereby for partial passage of the portion of the funnel therethrough, the funnel supports further each comprising a finger supported in relation to the opening for supporting at least a portion of the funnel, the finger being movable to a deflected position away from the body under load from the funnel upon inserting the portion of the funnel into the opening to apply pressure to the funnel to hold the funnel in relation to the opening, the collector forming an enclosure for collecting fluids draining from funnels supported by the funnel holder and drain system.

2. The funnel holder and drain system of claim 1, further comprising a mount, the collector being supported in relation to the mount, the mount being configured for mounting to an environmental surface for supporting the collector in relation to the environmental surface.

3. The funnel holder and drain system of claim 2, further comprising a canopy, the canopy being supported in relation to the mount above the collector to cover the collector and funnels supported by the collector, the canopy being dimensioned and configured to protect the funnels from collecting environment contaminants from above the canopy.

4. The funnel holder and drain system of claim 3, further comprising a drape supported in relation to the canopy, the drape providing an enclosure for enclosing the collector therein for protecting funnels supported by the collector from environmental contaminants, and the drape being formed from pliable sheets of material with portions configured to overlap in front the collector and be moved from an overlapping condition to provide access to funnels supported by the collector.

5. The funnel holder and drain system of claim 1, further comprising passage at a lower end of the collector configured for draining fluids collected from funnels supported by the collector.

6. The funnel holder and drain system of claim 5, further comprising a valve supported in relation to the passage, the valve being configured to open to drain fluids from the collector and close to prevent fluids from draining from the collector.

7. The funnel holder and drain system of claim 1, further comprising a brace supported in relation to the collector, the brace being configured to support a first fluid tester, the collector being configured to collect fluid draining from the first fluid tester.

8. The funnel holder and drain system of claim 7, wherein the collector has at least one hole passing therethrough for receiving a tube from the first fluid tester from which fluid can drain into the collector.

9. The funnel holder and drain system of claim 7, wherein the brace is configured to support a plurality of fluid testers, including the first fluid tester, and the collector is configured to collect fluid draining from the fluid testers.

10. The funnel holder and drain system of claim 9, wherein the collector is a first collector, the funnel holder and drain system further comprising a second collector, the first collector being supported in relation to the second collector, the second collector having at least one upper open end for supporting a second fluid tester for drainage into the second collector and a lower end in fluid communication with the first collector for draining the second collector into the first collector.

11. The funnel holder and drain system of claim 10, further comprising a mount, the second collector being supported in relation to the mount, the mount being configured for mounting the second collector in relation to an environmental surface.

12. The funnel holder and drain system of claim 11, wherein the brace is configured to support fluid testers including first and second fluid testers and laterally disposed third and fourth fluid testers, and wherein the second collector comprises laterally disposed holes passing therethrough for receiving a tube from the third and fourth fluid testers from which fluid can drain into the collector.

13. The funnel holder and drain system of claim 1, wherein the openings in the body comprise an arcuate upper portion and a narrowing lower portion, and wherein the fingers comprise an upper end with a relief that is arcuate in shape to receive an outer surface of a funnel supported thereby.

14. The funnel holder and drain system of claim 13, wherein the fingers comprise a general shape that generally comports with a shape of the openings in the body, the fingers comprise a forked upper end and a narrowing lower end, the forked upper end comprising opposingly disposed lateral tines that extend upward to provide lateral supports for supporting a portion of a funnel therebetween, the narrowing end of the fingers originating from the body proximate the narrowing lower portion of the openings in the body.

15. The funnel holder and drain system of claim 1, wherein the body is a cylindrical body formed of plastic, the cylindrical body being defined a wall, the openings in the body and the fingers being simultaneously formed by cutting the wall about the finger with a lower end of the fingers remaining integral with the cylindrical body.

16. The funnel holder and drain system of claim 1, wherein the collector comprises a lower end, the funnel holder and drain system further comprising a cap to trap fluids in the collector, the cap comprising a passage in fluid communication with a drain valve configured to be controlled for releasing fluid therefrom.

17. The funnel holder and drain system of claim 1, wherein the collector is a first collector, the funnel holder and drain system further comprising a second collector, the first collector being supported in relation to the second collector, the second collector comprising a body having an L-shaped configuration with a vertical portion with an upper open end for supporting at least a first fluid tester for drainage into the vertical portion and a lower horizontal portion in fluid communication with the first collector for draining the second collector into the first collector.

18. The funnel holder and drain system of claim 17, further comprising a brace supported in relation to an upper end of the first collector, the upper open end of the vertical portion of the body of the second collector being supported in relation to the brace proximate the upper end of the first collector.

19. The funnel holder and drain system of claim 18, wherein the brace is configured to support a plurality of fluid testers, including a second fluid tester and laterally disposed third and fourth fluid testers, and wherein the first collector comprises a hole for receiving a siphon tube from the second fluid tester when supported by the brace and the second collector comprises laterally disposed holes for receiving a siphon tube from the third and fourth fluid testers when supported by the brace.

20. The funnel holder and drain system of claim 18, further comprising a mount configured to be mounted to an environmental surface, the second collector being supported in relation to the mount, the first collector being supported in relation to the second collector, with the brace supported in relation to the upper end of the first collector and the upper open end of the vertical portion of the body of the second collector being supported in relation to the brace proximate the upper end of the first collector.

21. The funnel holder and drain system of claim 1, wherein the opening in the body is dimensioned and configured to receive an upper edge of a funnel supported thereby, and the finger is movable to the deflected position away from the body under a load from the funnel upon inserting the upper edge of the funnel into the opening to apply pressure to the funnel to form a snap fit configuration between the funnel and the opening.

* * * * *